United States Patent [19]

Smith et al.

[11] 4,404,931

[45] Sep. 20, 1983

[54] STABLE FUEL BURNER FOR PREHEATING INTAKE AIR OF INTERNAL COMBUSTION ENGINE

[75] Inventors: Joel D. Smith, Columbus; Joseph M. Johnson, Nashville, both of Ind.

[73] Assignee: Cummins Engine Company, Inc., Columbus, Ind.

[21] Appl. No.: 205,099

[22] Filed: Nov. 10, 1980

Related U.S. Application Data

[63] Continuation of Ser. No. 959,650, Nov. 13, 1978, abandoned.

[51] Int. Cl.³ ............................................ F02M 31/00
[52] U.S. Cl. ................................ 123/179 H; 123/551; 431/265
[58] Field of Search ......... 123/179 H, 52 M, 142.5 R, 123/543, 550, 551; 239/124, 126, 127; 431/89, 265, 353, 116

[56] References Cited

U.S. PATENT DOCUMENTS

| | | | |
|---|---|---|---|
| 2,033,838 | 3/1936 | Lattner | 431/265 |
| 2,918,117 | 12/1959 | Griffin | 431/116 |
| 3,687,122 | 8/1972 | Kamo | 123/550 |
| 3,820,944 | 6/1974 | Flournoy et al. | 431/265 |
| 3,977,376 | 8/1976 | Reid et al. | 123/179 H |
| 3,977,377 | 8/1976 | Reid | 123/179 H |
| 4,027,242 | 6/1977 | Kamada et al. | 123/179 H |
| 4,030,464 | 6/1977 | Yamaguchi et al. | 123/179 H |
| 4,044,740 | 8/1977 | Gerrard | 123/179 H |

FOREIGN PATENT DOCUMENTS

| | | | |
|---|---|---|---|
| 2249615 | 1/1974 | Fed. Rep. of Germany | 123/179 H |
| 2358348 | 5/1975 | Fed. Rep. of Germany | 123/550 |
| 960071 | 10/1949 | France | . |
| 826510 | 1/1960 | United Kingdom | 431/265 |
| 893016 | 4/1962 | United Kingdom | . |
| 1188761 | 4/1970 | United Kingdom | . |
| 1341861 | 12/1973 | United Kingdom | . |
| 1358192 | 6/1974 | United Kingdom | . |

*Primary Examiner*—Parshotam S. Lall
*Attorney, Agent, or Firm*—Sixbey, Friedman & Leedom

[57] ABSTRACT

A fuel burner for producing a highly stable flame and predictable heat output for use within an environment subject to disruptive pressure changes and ambient air current flow such as the intake manifold of an internal combustion engine. The burner includes a nozzle for forming a cone shaped fuel spray and a flame surrounding shroud having a combustion gas outlet wherein the shroud is shaped to cause a toroidal pattern of recirculating combustion gases to be formed within the shroud. A circumferential lip surrounding the combustion gas outlet creates a low pressure zone within the shroud to cause a counterflow of ambient air into the shroud through the outlet in a cylindrical pattern coaxial with the exiting combustion gases.

19 Claims, 4 Drawing Figures

STABLE FUEL BURNER FOR PREHEATING INTAKE AIR OF INTERNAL COMBUSTION ENGINE

This application is a continuation of application Ser. No. 959,650, filed Nov. 13, 1978, now abandoned.

BACKGROUND OF THE INVENTION

1. Field of the Invention

This invention relates to fuel burners having high flame stability and to such fuel burners for heating the intake air of an internal combustion engine.

2. Discussion of the Prior Art

A fuel burner design has long been desired which satisfies the sometimes conflicting goals of low manufacturing and maintenance cost and of high flame stability and insensitivity to ambient air currents. These goals are particularly important to manufactures and users of internal combustion engines of the compression ignition type (diesel) since fuel burners are normally provided in the intake manifold of such engines to promote easier starting and to reduce exhaust smoke and other noxious emissions. A stable flame is particularly critical to the proper operation of burners used to preheat air within the intake manifold of an internal combustion engine since insufficient combustion will cause difficult starting and noxious exhaust emission and excessive combustion will deplete the available oxygen supply within the intake manifold thereby possibly preventing engine start up altogether.

A variety of burner designs have been proposed for use within an engine intake manifold such as illustrated in U.S. Pat. No. 3,687,122, assigned to the assignee of this invention. Each of the disclosed designs includes a fuel nozzle supplied with both fuel and air and a shroud for containing and directing the burner flame. While reasonably successful in achieving flame stability the various shroud designs disclosed in U.S. Pat. No. 3,687,122 are not always effective to prevent flame blow out and to insure sufficient heat generation without excessive consumption of fuel or oxygen within the intake manifold. This ineffectiveness derives in part from the requirement that an additional amount of air be supplied to the burner flame beyond the air supplied to the fuel nozzle in order to insure complete combustion of the burner fuel. Since this requirement is normally met by supplying air from the intake manifold to the burner flame through an opening in the shroud near the flame base, fluctuation in pressure and changing air flow within the intake manifold can have adverse effects on flame stability. Even where the flame shroud takes the form of a cup which completely surrounds and separates the flame base from the intake manifold, erratic fuel combustion can occur as a result of turbulent air flow into and out of the open end of the cup shaped shroud. Moreover, cup shaped shrouds must still be provided with an auxiliary flow of air near the base of the burner flame to insure complete combustion. This additional air is normally supplied through a conduit connected with an outside source of air such as illustrated in U.S. Pat. No. 3,977,377, also assigned to the same assignee as this invention. Such an auxiliary supply of air can add substantial cost to an intake preheater device while still not achieving optimum results.

One attempt to solve this dilemma is disclosed in U.S. Pat. No. 4,044,740 wherein a burner assembly having inner and outer annular casings are illustrated for disposition within an engine inlet manifold. While more efficient combustion and greater flame stability may be achieved with this burner design as compared with prior art designs, the complicated arrangement of inner and outer casings adds to manufacturing costs over previous designs and the obstructed exit passage for the combustion gases can lead to carbon deposits and excessive maintenance costs.

Another attempt to provide an efficient and yet highly versatile intake air burner assembly is illustrated in U.S. Pat. No. 4,027,642 wherein a fuel nozzle is mounted near the base of a cup shaped shroud which opens into the intake manifold of an engine. Auxiliary air is provided to the flame area through an opening adjacent one side of the combustion gas outlet of the cup shaped shroud apparently resulting in some recirculation of combustion gases within the cup shaped shroud. However, the recirculation path is illustrated as being nonsymmetric and thus subject to irregular behavior and flame instability.

Outside of the intake air heater art, it has been disclosed for example in U.S. Pat. No. 2,033,838, to provide a fuel burner with a shroud including a cylindrical body portion for surrounding the liquid fuel nozzle wherein the shroud includes a combustion gas outlet opening defined by an inturned lip. This patent further discloses a fan designed to force air through the shroud and out the aperture defined by the inturned lip thereby adding to the cost and complexity of the burner. In short, no prior art fuel burner has taught a simple yet effective way of achieving sufficient flame stability to meet the stringent requirements of an effective intake air preheater device.

OBJECTS OF THE INVENTION

It is an object of this invention to overcome the deficiencies of the prior art as discussed above. In particular it is a general object of this invention to provide a very simple fuel burner design capable of producing a flame which is substantially unaffected by ambient air currents and changing pressures.

A more specific object of this invention is to provide a liquid fuel burner for forming a flame resistant to blow out including a fuel injection nozzle for forming a cone shaped atomized fuel spray in combination with a flame shroud shaped to complement the cone shaped atomized fuel spray in such a manner as to cause a toroidally shaped pattern of recirculating combustion products to form within the shroud.

Yet another object of this invention is to provide a fuel burner for use in preheating the air within an internal combustion engine intake manifold wherein the need for an auxiliary supply of air outside of the intake manifold for insuring complete combustion of the fuel supplied to the burner has been eliminated without sacrificing burner flame stability.

Another object of this invention is to provide a fuel burner shroud having a combustion gas outlet defined by an inturned circumferential lip formed to cause a cylindrical counterflow of ambient air into the shroud surrounding the outflow of combustion gases through the combustion gas outlet.

Still another object of this invention is to provide an intake air heating device for an internal combustion engine having an air intake manifold and a fuel system for supplying fuel to the engine at a variable pressure to control engine speed. A fuel flow control is provided for the heating device which receives fuel supplied under pressure by the fuel system of the engine and which controls the flow of fuel to the burner in accordance with a predetermined schedule related to engine speed in order to achieve optimum heating of the intake air supplied to the engine.

The above objects are achieved by a liquid fuel burner including a fuel injection nozzle supplied with air and fuel designed to form a cone shaped spray of atomized fuel and a flame shroud defining a combustion chamber having an inside cylindrical surface and an inturned circumferential lip at one end of the shroud shaped to define a combustion gas outlet aperture having a diameter equal to the diameter of the base of the cone shaped fuel spray. The fuel nozzle is positioned adjacent one end of the combustion chamber in a manner to direct the cone shaped fuel spray symmetrically along the central axis of the cylindrical surface of the combustion chamber with the nozzle being spaced from the combustion gas outlet by a distance equal approximately to the diameter of the outlet. The cone shaped fuel spray is shaped to cause the circumferential edge of the cone base to terminate in a region of the combustion chamber bounded by the cylindrical surface and the inturned circumferential lip but spaced approximately equally therefrom whereby upon operation of the burner, a toroidally shaped pattern of recirculating combustion products is formed within a toroidal zone of the combustion chamber bounded by the circumferential lip and the cylindrical surface. A scheduled flow of fuel is achieved by a fuel circuit including a main restriction orifice for supplying fuel from the engine fuel supply system and a pair of parallel branches, one branch feeding fuel to the burner through a restriction orifice equal to the main restriction orifice and the second branch returning fuel to the engine fuel tank through a pressure regulator and a restriction orifice which is larger than the main restriction orifice.

These and other objects of the invention will become apparent from the following summary of the drawings and description of the preferred embodiments.

DESCRIPTION OF THE PREFERRED EMBODIMENTS

Figure 1:
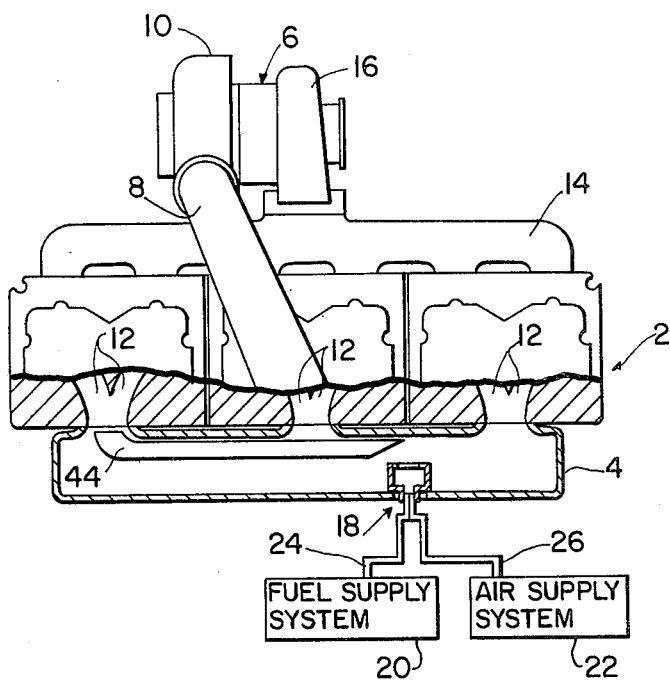
FIG. 1 is a partially cut away top elevational view of an internal combustion engine equipped with fuel burner designed in accordance with the subject invention for use as an intake air preheater device.

The subject invention relates to a fuel burner adapted for use as an intake air heating device for an internal combustion engine. The burner is characterized by an extremely stable flame which is insensitive to pressure and air flow changes within the intake manifold of the engine. Included in the fuel burner is a shroud substantially surrounding the flame wherein the shroud is designed to create a toroidally shaped pattern of recirculating combustion gases to promote flame stability and predictable heat generating capacity over a broad range of engine operating conditions.

To understand the manner by which the various improvements noted above are achieved, reference is made to FIG. 1 in which an internal combustion engine 2 of the compression ignition type is illustrated including an intake manifold 4 arranged to receive intake air from a turbo charger 6 through an air passage 8 connected with the compressor stage 10 of the turbo charger. The intake manifold is designed to in turn distribute the air received from turbo charger to each of the input ports 12 leading to the respective engine cylinders, not illustrated.

The details of the operation of an engine of the type illustrated in FIG. 1 are well known. Briefly, however, the diesel engine compresses air in cylinders by pistons (both not shown) so that temperatures are high enough to spontaneously ignite fuel injected into each cylinder at the top of the compression stroke. The resulting explosion drives the pistons downward and produces a rotary output to an engine crank shaft (also not shown). The exhaust gases are expelled from the engine 2 through an exhaust manifold 14. The exhaust manifold 14 directs the exhaust gases through a turbine stage 16 of the turbo charger 6. The turbine stage 16 is mechanically linked with the compressor stage 10 to provide air under pressure to the intake manifold 4.

When ambient air temperatures are sufficiently low, a diesel engine requires assistance, such as the heating of the intake air to enable the engine to start. In addition, modern turbo charged and after cooled engines require heating of intake air during certain operating conditions to avoid the occurrence of white smoke and other undesirable exhaust emissions. In the subject invention, the inlet air is heated by a liquid fuel burner 18 arranged to provide an extremely stable flame and predictable fuel consumption as referred to above. In order to distribute the heating effect of the flame produced by burner 18, a distribution tube 44 may be provided to insure that heated air is evenly distributed among the inlet ports 12. As is clearly illustrated in FIG. 1, both fuel and air are supplied to the burner 18 from respective supply systems 20 and 22 through conduits 24 and 26, respectively.

Figure 2:
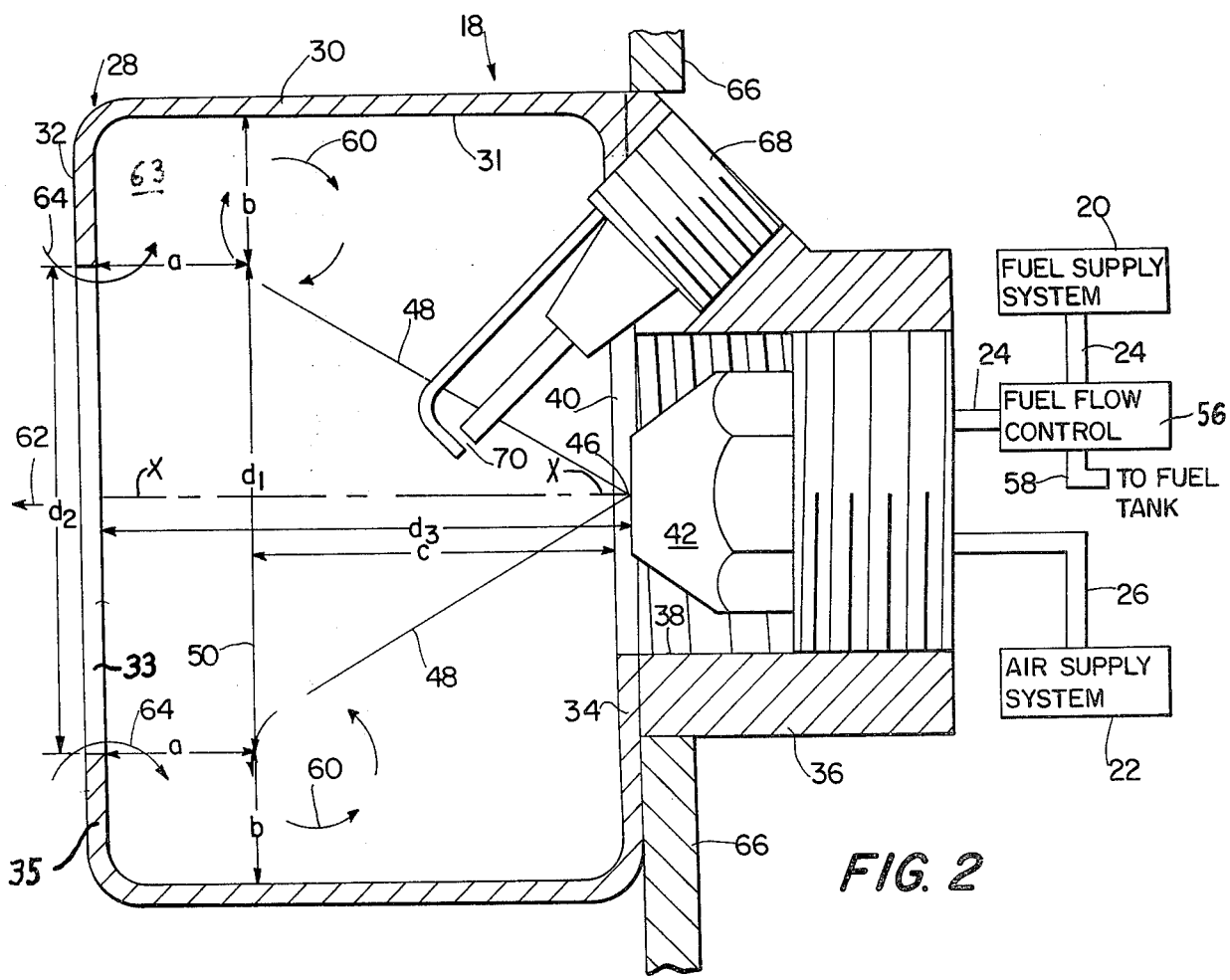
FIG. 2 is a cross sectional view of the burner illustrated in FIG. 1.

Referring now to FIG. 2, the fuel burner 18 of FIG. 1 is disclosed in greater detail including a shroud 28 for defining a combustion chamber within which the burner flame is contained. The shroud 28 includes a first portion formed as a generally cylindrical wall 30 and a second portion formed as a first end wall 32 closing off one end of the cylindrical wall 30. As is apparent in FIG. 2, cylindrical 30 includes an interior surface 31 shaped as a surface of revolution around axis X—X. In the preferred embodiment this interior surface 31 is cylindrical in shape. The flat inside surface formed by end wall 32 is arranged generally perpendicularly with respect to axis X—X and includes a combustion gas outlet 33 centrally formed in wall 32. Thus, end wall 32 includes a circumferential inturned lip 35 intersecting with cylindrical wall 30 of shroud 28 and extending inwardly toward axis X—X.

Shroud 28 includes a third portion formed as an end wall 34 closing off the open end of cylindrical wall 30 opposite the end wall 32. The flat inside surface of end wall 34, as can be seen in FIG. 2, is also preferably arranged perpendicularly to axis X—X. On the outside surface of end wall 34, a fitting 36 is mounted including a threaded interior cavity 38 aligned with an inlet aperture 40 contained in end wall 34 in such a position that the central axis of the threaded interior cavity 38 is an extension of axis X—X. A fuel atomizing nozzle 42, having exterior threads 44 adapted to mate with the threads of interior cavity 38, is positioned within cavity 38 such that the outlet opening 46 of the fuel atomizing nozzle is positioned within inlet aperture 40 along axis X—X. While a variety of nozzles may be employed, a particularly suitable nozzle is an air syphoning nozzle manufactured by Delavan Manufacturing Company, 811 Fourth Street, West Des Moines, Iowa designated as model no. 3060. Nozzles of this type are characterized by the production of a cone shaped pattern of atomized fuel illustrated schematically in FIG. 2 by lines 48. This cone shaped spray has an apex located at the outlet orifice 46 of the fuel atomizing nozzle. In the position illustrated in FIG. 2, the axis of the cone shaped spray is coincident with axis X—X.

The base of the cone shaped spray produced by nozzle 42, illustrated schematically by line 50, is selected to compliment the shape of the combustion chamber defined by shroud 28. In particular, the diameter of the cone base $d_1$ is equal to the diameter $d_2$ of combustion gas outlet 33 formed in the end wall 32. The total axial length of shroud 28 represented by $d_3$ is also equal to $d_1$ and $d_2$. When Delavan atomizing nozzle model 3060 is employed, the base of the spray cone has a diameter of $1\frac{1}{2}$ inch which thus determines the size of $d_2$ and $d_3$ of shroud 28.

The diameter of the interior cylindrical surface formed by first portion 30 is equal to $d_1$ plus $2b$ wherein b has been found to be preferably equal to about $\frac{1}{3}$ of $d_1$ thus making the inside diameter of shroud 28 equal to approximately $1\frac{2}{3} d_1$ or approximately $2\frac{1}{2}$ inch when the Delavan nozzle is employed as referred to above. The approximate distance of the cone shaped spray formed by nozzle 42 from the combustion gas outlet 33, represented by the letter a in FIG. 2 has generally been found preferably to be equal to the distance b thus the height of the cone shaped spray, c, is equal to approximately $\frac{2}{3}$ of $d_1$. While the various dimensions illustrated in FIG. 2 can be varied somewhat, the operation of the shroud illustrated in FIG. 2 has been found to produce the most stable flame and predictable heat outlet when the dimensions are held to the values indicated above.

The Delavan nozzle referred to above is a type which operates with a separate fuel supply and air supply as described with reference to FIG. 1 and shown in more detail in FIG. 2. In particular, the fuel supply system 20 may be the fuel supply of the internal combustion engine on which the intake manifold burner of FIG. 2 is mounted. Air supply system 32 may be an electric motor powered air pump manufactured by Denton Division of AMBAL Industries designated as model no. 18300.

One known type of internal combustion engine for which the subject invention is particularly well suited is a fuel injected diesel engine manufactured by Cummins Engine Company, Columbus, Indiana designated as WT6-450 having a fuel supply system adapted to control the engine speed and output by varying the pressure of fuel supplied to the various fuel injectors. Thus the pressure under which fuel would be supplied to nozzle 42 is not necessarily that which is desired in operating the burner as an intake air preheater. Accordingly, a fuel flow control 56 is employed and will be described in greater detail hereinbelow, wherein a portion of the fuel obtained from the engine fuel supply system 20 is returned to the engine fuel tank via conduit 58 in order to maintain the flow through conduit 24 leading to nozzle 42 in accordance with a desired schedule relating to engine rpm as will be discussed with reference to FIG. 4.

When operated in accordance with this invention, the fuel injected into the combustion chamber of shroud 28 will, upon ignition, tend to create a torodial pattern of recirculating combustion gases represented by arrows 60. Simultaneously, combustion gases are forced through the center portion of aperture 33 as represented by arrow 62. The combination of a toroidal pattern of recirculating gases as illustrated by arrow 60 and the exiting of combustion gases as represented by arrow 62 causes a low pressure zone 63 to form inside of the inturned circumferential lip 35 of first end wall 32. This low pressure has the effect of causing air outside of the shroud to flow into the combustion chamber in a cylindrical pattern represented by arrows 64 surrounding coaxially the flow of combustion gases represented by arrow 62.

By this arrangement, no separate provision need be made for auxiliary air supply to the combustion chamber as has been the case with prior art burners employed as intake preheating devices for internal combustion engines. Moreover, the flame stability achieved by the subject burner design is of such high quality that the combustion taking place within shroud 28 is virtually immune to air current flow and pressure changes within the intake manifold of an engine within which the burner is mounted. As illustrated in FIG. 2 this mounting may take the form of a connection between fitting 36 and the walls 66 of the intake manifold. Other mountings of course are permissible as desired. The ignition of the atomized fuel within shroud 28 is brought about by a spark plug mounted in a threaded aperture formed in fitting 36 such that the spark forming gap 70 is positioned within or adjacent to the cone shaped fuel spray formed by nozzle 42.

Figure 3:
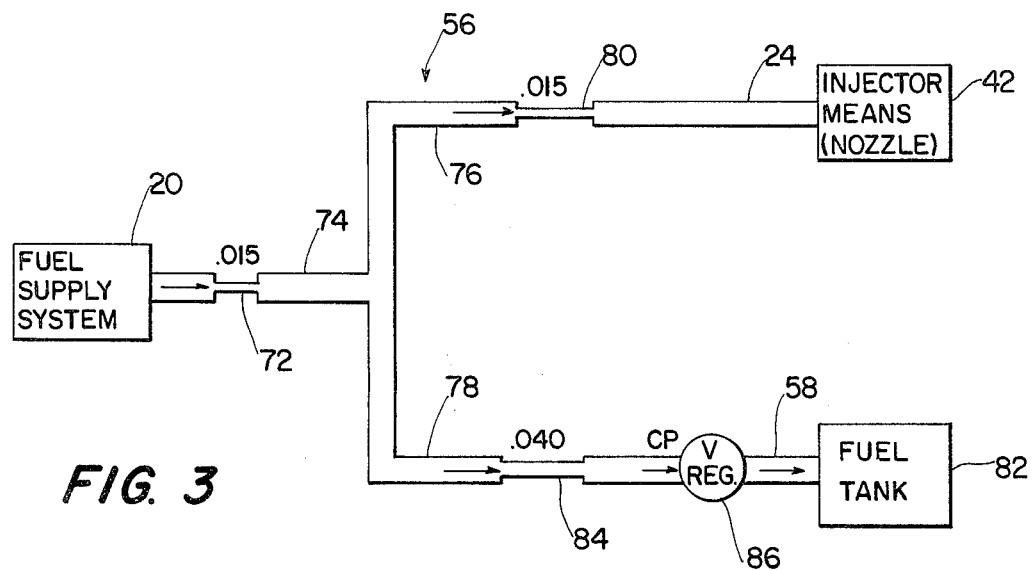
FIG. 3 is a schematic diagram of a fuel supply system for use with the fuel burner of FIGS. 1 and 2.

Referring now to FIG. 3, the fuel flow control 56 of FIG. 2 is shown in greater detail in FIG. 3. The fuel control 56 includes a fuel circuit having a main restriction orifice 72 formed in a conduit 74 connected at one end to the fuel supply system 20 and at the other end to a pair of parallel branches 76 and 78. Branch 76 is connected at one to conduit 74 and at the other end to an injector means of the fuel burner which in the case of the burner illustrated in FIG. 2, is constituted by nozzle 42. Intermediate the ends of branch 76 is a second flow restricting orifice 80. Parallel branch 78 is connected at one end to conduit 74 and at the other end to conduit 58 which returns fuel to the engine fuel tank 82 as is illustrated in FIG. 3. Intermediate the ends of branch 78 is a third flow restricting orifice 84 upstream from a pressure regulating valve 86 adapted to produce a constant pressure of 1.5 psi in the section of branch 78 between valve 86 and flow restricting orifice 84.

Figure 4:
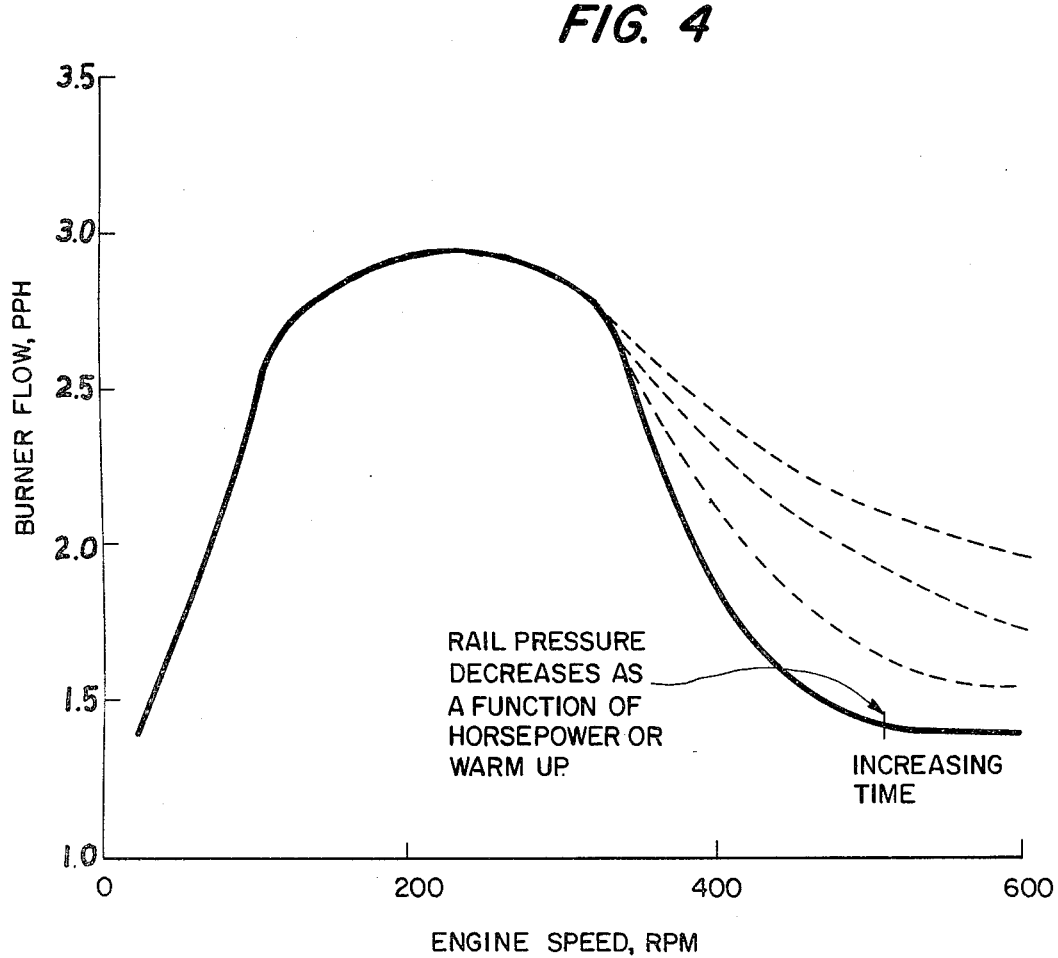
FIG. 4 is a graph of the fuel supplied to fuel burner using a supply system as disclosed in FIG. 3.

When the flow control circuit 56 of FIG. 3 is subjected to the scheduled fuel pressure produced by a fuel supply system 20 of a typical diesel engine, wherein fuel pressure is varied to control engine speed and power, the rate of fuel flow reaching nozzle 42 is disclosed in the graph of FIG. 4 for each of the engine speeds indicated therein. It can thus be seen that the fuel flow reaching nozzle 42 will be greatest from about 150 rpm to about 350 rpm. This flow rate has been found to be generally ideal for a fuel burner of the type disclosed herein and is achieved by employing the circuit of FIG. 3 wherein flow restricting orifices 72 and 80 are 0.015 inches in diameter and flow restricting orifice 84 is 0.040 inches in diameter.

It is now apparent that a fuel burner has been disclosed for producing a highly stable flame and predictable heat output for use within an environment subject to disrupting pressure and ambient air current flow. The disclosed fuel burner is thus particularly well suited for use as an intake air preheater for an internal combustion engine of the type controlled by variation in fuel pressure supplied to the fuel injectors of the engine.

What is claimed is:

1. A fuel burner for forming a flame resistant to blow out due to cross or counter flow of ambient air, said fuel burner comprising:
   (a) a combustion chamber including a first portion having a first interior surface shaped as a surface of revolution and a second portion positioned at one end of said first portion to extend perpendicularly to said first portion in a radial direction toward the axis of revolution of said first interior surface to form an end wall, said end wall having positioned therein a single central outlet aperture, said single central outlet aperture being positioned symmetrically with respect to said axis of revolution so that the center of said aperture coincides with said axis of revolution, said central aperture forming the sole path for fluid passage through said end wall; and
   (b) injector means for injecting fuel into said combustion chamber, said injector means including a nozzle means positioned along said axis of revolution at a point within the combustion chamber opposite said second portion for forming an atomized conical spray pattern symmetric with said axis of revolution, said atomized conical spray pattern having an apex positioned at said nozzle means and a base positioned inwardly from said aperture at both a first predetermined distance in an axial direction from said outlet aperture and a second predetermined distance in a radial direction from said first interior surface, the location of the base of said conical spray pattern creating a toroidal zone within said combustion chamber positioned concentrically around said axis of revolution between said conical spray pattern and said interior surface and a low pressure zone within said combustion chamber between said central aperture and said base, causing combustion products simultaneously to recirculate in a toroidal flow pattern within said toroidal zone and to flow through said outlet aperture along an exit flow path, further causing a counterflow of ambient air to be drawn into said low pressure zone through said single outlet aperture.

2. A fuel burner as defined in claim 1, wherein said first portion is a cylindrical wall and said first interior surface is a cylindrical surface.

3. A fuel burner as defined in claim 1, wherein said outlet aperture is circular and is centered around the axis of revolution.

4. A fuel burner as defined in claim 3, wherein said nozzle means is spaced from said outlet aperture by a distance equal to the diameter of said outlet aperture.

5. A fuel burner as defined in claim 4, wherein the base of said cone has a diameter equal to the diameter of said outlet aperture and further wherein the inside diameter of said cylindrical surface is equal to approximately 1⅝ times the diameter of said outlet aperture.

6. A fuel burner as defined in claim 1, wherein said combustion chamber communicates with the ambient environment only through said outlet aperture.

7. A fuel burner as defined in claim 1, wherein said injector means is connected with a source of air and a source of fuel such that said nozzle means premixes air and fuel for discharge into said combustion chamber.

8. A fuel burner as defined in claim 1, further including electrical ignition means for igniting the fuel within said combustion chamber upon receipt of an electrical energizing signal.

9. An intake air heating device for an internal combustion engine having an air intake manifold, comprising a combustion chamber adapted to be mounted in communication with the air intake manifold, said combustion chamber including a first portion having a first interior surface defining a surface of revolution and a second portion positioned at one end of said first portion to extend perpendicularly to said first portion in a radial direction toward the axis of revolution of said first interior surface to form an end wall, said end wall having positioned therein a single central outlet aperture communicating with the interior of the intake manifold, said central aperture forming the sole path for fluid passage through said end wall; and injector means for injecting fuel into said combustion chamber, said injector means including a nozzle means positioned along said axis of revolution at a point within said combustion chamber opposite said second portion for forming an atomized conical spray pattern symmetric with said axis of revolution, said atomized conical spray pattern having an apex positioned at said nozzle means and a base positioned inwardly from said aperture at both a first predetermined distance along an axial direction from said outlet aperture and a second predetermined distance along a radial direction from said first interior surface, the location of the base of said conical spray pattern creating a toroidal zone within said combustion chamber positioned concentrically around said axis of revolution between said conical spray pattern and said interior surface and a low pressure zone within said combustion chamber between said central aperture and said base, causing combustion products simultaneously to recirculate in a toroidal flow pattern within said toroidal zone and to flow through said outlet aperture along an exit flow path, further causing a counterflow of ambient air to be drawn into said low pressure zone through said single outlet aperture.

10. An air heating device as defined in claim 9, wherein said first portion is a cylindrical wall and said first interior surface is a cylindrical surface.

11. An air heating device as defined in claim 10, wherein said injector means includes a nozzle, said nozzle means being positioned along the axis of revolution at a point within the combustion chamber opposite said second portion.

12. An air heating device as defined in claim 9, wherein said outlet aperture is circular and is centered around the axis of revolution.

13. An air heating device as defined in claim 12, wherein said nozzle means is spaced from said outlet aperture by a distance equal to the diameter of said outlet aperture and further wherein the inside diameter of said cylindrical surface is equal to approximately 1⅝ times the diameter of said outlet aperture.

14. An air heating device as defined in claim 13, wherein the base of said cone has a diameter equal to the diameter of said outlet aperture.

15. An air heating device as defined in claim 9, wherein said combustion chamber communicates with the ambient environment only through said outlet aperture.

16. An air heating device as defined in claim 9, further including electrical ignition means for igniting the fuel within said combustion chamber upon receipt of an electrical energizing signal.

17. In an internal combustion engine having an air intake manifold and a fuel system for supplying fuel to the engine at a controllably variable pressure to control engine speed, an intake air heating device comprising a combustion chamber adapted to be mounted in communication with the air intake manifold, said combustion chamber including a first portion having a first interior surface shaped as a surface of revolution and a second portion positioned at one end of said first portion to extend perpendicularly to said first portion in a radial direction toward the axis of revolution of said first interior surface to form an end wall, said end wall having positioned therein a single central outlet aperture communicating with the interior of the intake manifold, said central aperture forming the sole path for fluid passage through said end wall; and injector means for injecting fuel into said combustion chamber, said injector means including a nozzle means positioned along said axis of revolution at a point within said combustion chamber opposite said second portion for forming an atomized conical spray pattern symmetric with said axis of revolution, said atomized conical spray pattern having an apex positioned at said nozzle means and a base positioned inwardly from said aperture at both a first predetermined distance along an axial direction from said outlet aperture and a second predetermined distance along a radial direction from said first interior surface, the location of the base of said conical spray pattern creating a toroidal zone within said combustion chamber positioned concentrically around said axis of revolution between said conical spray pattern and said interior surface and a low pressure zone within said combustion chamber between said central aperture and said base, causing combustion production simultaneously to recirculate in a toroidal flow pattern within said toroidal zone and to flow through said outlet aperture along an exit flow path, further causing a counterflow of ambient air to be drawn into said low pressure zone through said single outlet aperture, said injector means being connected with a source of air and said fuel system and said nozzle means premixing the air and fuel for discharge into said combustion chamber in said predetermined atomized spray pattern.

18. An intake air heating device as defined in claim 17, further including a fuel flow control means for modulating the flow of fuel from said fuel system in accordance with a predetermined schedule relative to engine speed.

19. In an internal combustion engine having an air intake manifold and a fuel system for supplying fuel to the engine at a controllably variable pressure to control engine speed, an intake air heating device comprising a combustion chamber adapted to be mounted in communication with the air intake manifold, said combustion chamber including a first portion having a first interior surface shaped as a surface of revolution and a second portion having a second interior surface arranged to extend inwardly with respect to the axis of revolution of said first interior surface, said second portion including a circumferential lip intersecting with said first portion and extending inwardly toward and terminating short of said axis of revolution to define an outlet aperture communicating with the interior of the intake manifold; and injector means for injecting fuel into said combustion chamber, said injector means including a nozzle means positioned along said axis of revolution at a point within said combustion chamber opposite said second portion for forming an atomized conical spray pattern symmetric with said axis of revolution, said atomized conical spray pattern having an apex positioned at said nozzle means and a base positioned inwardly at both a first predetermined distance along an axial direction from said outlet aperture and a second predetermined distance along a radial direction from said first interior surface to cause a toroidal shaped pattern of recirculating combustion products to form within a toroidal zone of said combustion chamber located concentrically around said axis of revolution between said atomized conical spray pattern and said first interior surface while simultaneously causing combustion products to heat the air entering the internal combustion engine by permitting the combustion products to exit through said outlet aperture into the intake manifold along an exit flow path such that a low pressure zone is created between said circumferential lip and said toroidal zone to cause a counter flow of ambient air to enter said combustion chamber through said outlet aperture via an envelope concentrically positioned between said exit flow path and the inside edge of said circumferential lip, said injector means being connected with a source of air and said fuel system and said nozzle means premixing the air and fuel for discharge into said combustion chamber in said predetermined atomized spray pattern, further including a fuel flow control means for modulating the flow of fuel from said fuel system in accordance with a predetermined schedule relative to engine speed, wherein said fuel flow control means includes a main conduit connected with said fuel system, said main conduit including a first restriction orifice and a pair of branches, one said branch being connected at one end with said main conduit and at the other end with said injector means and including a second restriction orifice, the other said branch being connected at one end to said main conduit and at the other end to a fuel return line, said other branch including a third restriction orifice and a pressure regulation orifice and a pressure regulating valve downstream of said third restriction orifice, said first and second restriction orifices having equal diameters, said third restriction orifice having a diameter greater than the diameter of said first and second restriction orifices.

* * * * *